(12) United States Patent
Demandolx et al.

(10) Patent No.: US 7,675,652 B2
(45) Date of Patent: Mar. 9, 2010

(54) CORRECTING EYE COLOR IN A DIGITAL IMAGE

(75) Inventors: Denis C. Demandolx, Redmond, WA (US); Douglas A. Ricard, Woodinville, WA (US); Karthik G. Anbalagan, Bellevue, WA (US); Sergei S. Shinkevich, Redmond, WA (US); Steve J. White, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1010 days.

(21) Appl. No.: 11/348,064

(22) Filed: Feb. 6, 2006

(65) Prior Publication Data

US 2007/0182997 A1      Aug. 9, 2007

(51) Int. Cl.
  *H04N 1/407*   (2006.01)
  *H04N 1/409*   (2006.01)
  *G06T 5/00*    (2006.01)
  *G03F 3/08*    (2006.01)
  *G06K 9/00*    (2006.01)

(52) U.S. Cl. ............. 358/3.26; 358/518; 382/163; 382/167

(58) Field of Classification Search ......... 358/518–523, 358/3.26, 1.9, 3.27, 527; 382/117, 167, 162, 382/163; 396/158
See application file for complete search history.

(56) References Cited

U.S. PATENT DOCUMENTS

| | | | |
|---|---|---|---|
| 6,016,354 A * | 1/2000 | Lin et al. | 382/117 |
| 6,728,401 B1 * | 4/2004 | Hardeberg | 382/167 |
| 2004/0141657 A1 | 7/2004 | Jarman | |
| 2004/0223063 A1 | 11/2004 | DeLuca | |
| 2004/0240747 A1 | 12/2004 | Jarman | |
| 2005/0047655 A1 * | 3/2005 | Luo et al. | 382/167 |
| 2007/0098260 A1 * | 5/2007 | Yen et al. | 382/167 |
| 2007/0140556 A1 * | 6/2007 | Willamowski et al. | 382/167 |

OTHER PUBLICATIONS

Dave Nagel, Working with Photoshop's Channel Mixer, www.macdesignpro.com/articles/viewarticle.jsp?id+29991 dated Jan. 9, 2005, pp. 1-3.
Patent Cooperation Treaty, International Search Report and Written Opinion, Jul. 10, 2007.

* cited by examiner

*Primary Examiner*—James A Thompson
(74) *Attorney, Agent, or Firm*—Shook Hardy & Bacon LLP

(57) ABSTRACT

A method is provided for correcting undesired eye color in a digital image. Color information from the digital image is used to identify an orthogonal color channel. The orthogonal color channel is a channel corresponding to a color that is orthogonal to the undesired color. Information from the orthogonal color channel is used to perform channel mixing. The channel mixing is selectively applied to the original digital image using a masking effect to retain certain portions of the original image and replace certain portions of the original image with the channel-mixed image. This method achieves natural-looking black pupils and preserves specular reflections to conceal the fact that the digital image has been corrected.

17 Claims, 8 Drawing Sheets

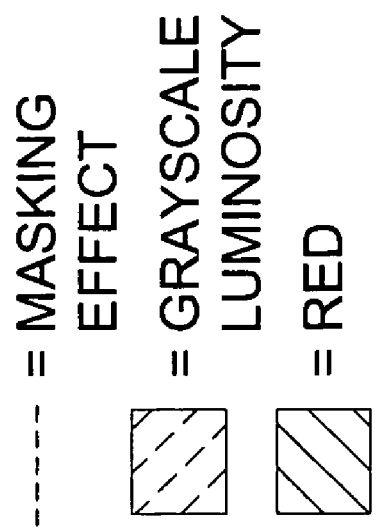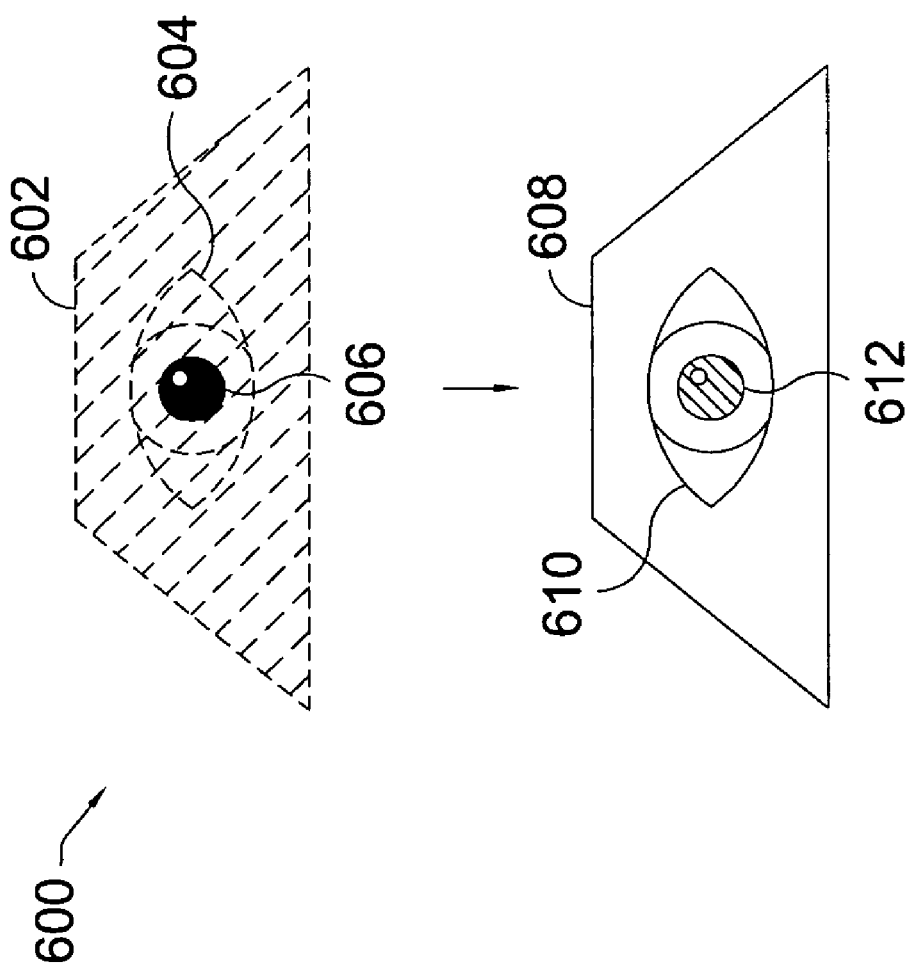
FIG. 6

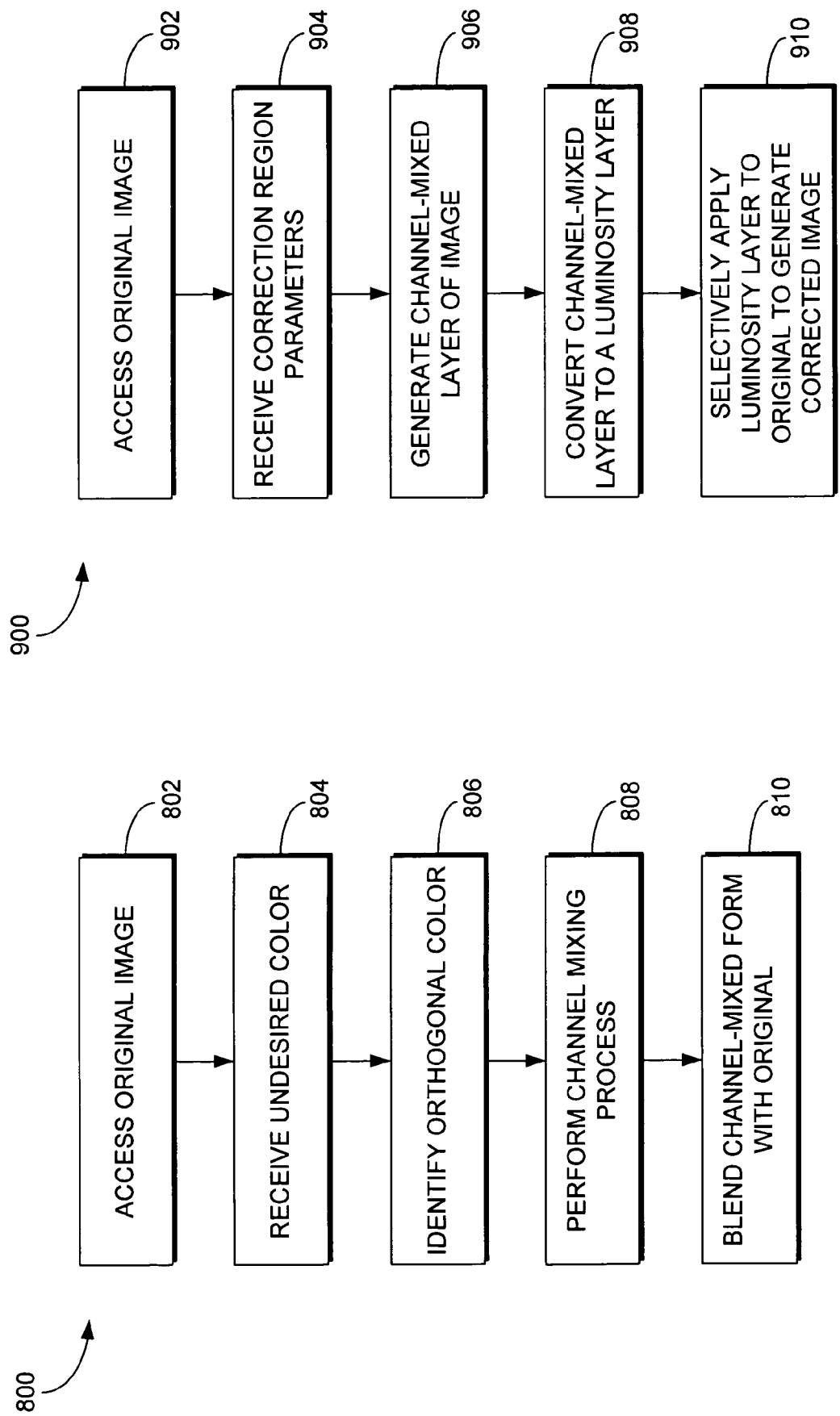

ical to the undesired eye coloring is identified from the color information present in the digital image. A channel mixing process is performed using the orthogonal color. The channel mixing is then selectively applied to the original image to generate a corrected digital image.

CORRECTING EYE COLOR IN A DIGITAL IMAGE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention generally relates to computer software. More specifically, the present invention relates to digital image applications.

BACKGROUND

A common problem associated with using flash photography is the occurrence of a phenomenon known as "red-eye." When a flash photography device such as a digital camera is used to capture an image, the flash can reflect off of the retina of an eye if the flash source and eye are within approximately five degrees of horizontal alignment. This reflection will cause the eyes of a human subject to appear red in the image. More specifically, the pupil region of the eyes will be red in the image. In a related context, "pet-eye" can occur when the flash reflects off of the retina of an animal eye. In this context, the pupil region of the animal subject's eye will often appear green, but can be various different colors. In either situation, the red, green, or other eye color resulting from the flash is an undesired eye color present in the captured digital image. The desired coloring of the pupil is usually black, which is the naturally appearing color of most pupils.

An advantage of digital imaging is the ability to alter or edit digital images to correct for flaws or undesired effects, such as "red-eye." Various methods have been devised in the art for correcting red-eye in digital images. However, these methods suffer from several drawbacks. Among these drawbacks is creation of unnatural-looking, gray pupils. For example, a simple desaturation technique will often result in hazy, gray pupils. Some methods achieve blackened pupils, but also result in the removal of the specular reflection from the pupil. The specular reflection is the desired, natural-looking reflection of light off of the pupil. Removal of this reflection results in unnatural-looking pupils that appear to have been artificially altered. One goal of digital image editing is to make an image appear natural without also making it obvious that the image was edited, altered, or enhanced in any way. So, some correction methods suffer from the drawback of generating corrected images that obviously appear to have been altered.

Other correction methods are burdensome on computer system resources. Some correction methods are slow and not well-suited to being applied to numerous images. Other methods are inconsistent and unreliable. For particular digital images, the correction method may perform a fix of acceptable quality, but for other images, bizarre results can occur. For example, some methods can occasionally result in the appearance of halo-like effects on the subject's pupils.

BRIEF SUMMARY

In an embodiment, a method for correcting undesired eye coloring in a digital image is provided. A color that is orthogonal to the undesired eye coloring is identified from the color information present in the digital image. A channel mixing process is performed using the orthogonal color. The channel mixing is then selectively applied to the original image to generate a corrected digital image.

In another embodiment, a method for replacing undesired eye pupil coloring with desired eye pupil coloring in a digital image is provided. An orthogonal color channel is identified from the undesired eye pupil color. A channel mixing process is used to output only the luminosity data from the orthogonal color to generate a channel mixed form of the image. The channel mixed form of the image is then applied to target pupil-shaped regions of the original form of the image using a masking effect to generate a corrected digital image.

In another embodiment, a method for correcting red-eye in a digital image using layers is provided. A channel mixed layer is generated using color information from a green color channel. The channel mixed layer is then converted to a luminosity layer by extracting the luminance data from the green channel. The luminosity layer is then selectively applied to red-eye affected pupil regions using a feathered masking effect to generate a corrected digital image.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

Embodiments of the present invention are described in detail below with reference to the attached drawing figures, which are incorporated by reference herein and wherein:

FIG. 6 is a diagram illustrating a red-eye correction method, according to embodiments of the present invention;

FIG. 8 is a flow chart depicting an eye color correction method using a channel mixing process, according to embodiments of the present invention;

FIG. 9 is a flow chart depicting an eye color correction method using layers, according to embodiments of the present invention.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Embodiments of the present invention provide methods for correcting undesired eye-coloring in digital images. An exemplary operating environment for embodiments of the present invention is described below, though many other suitable operating environments can be used.

Figure 1:
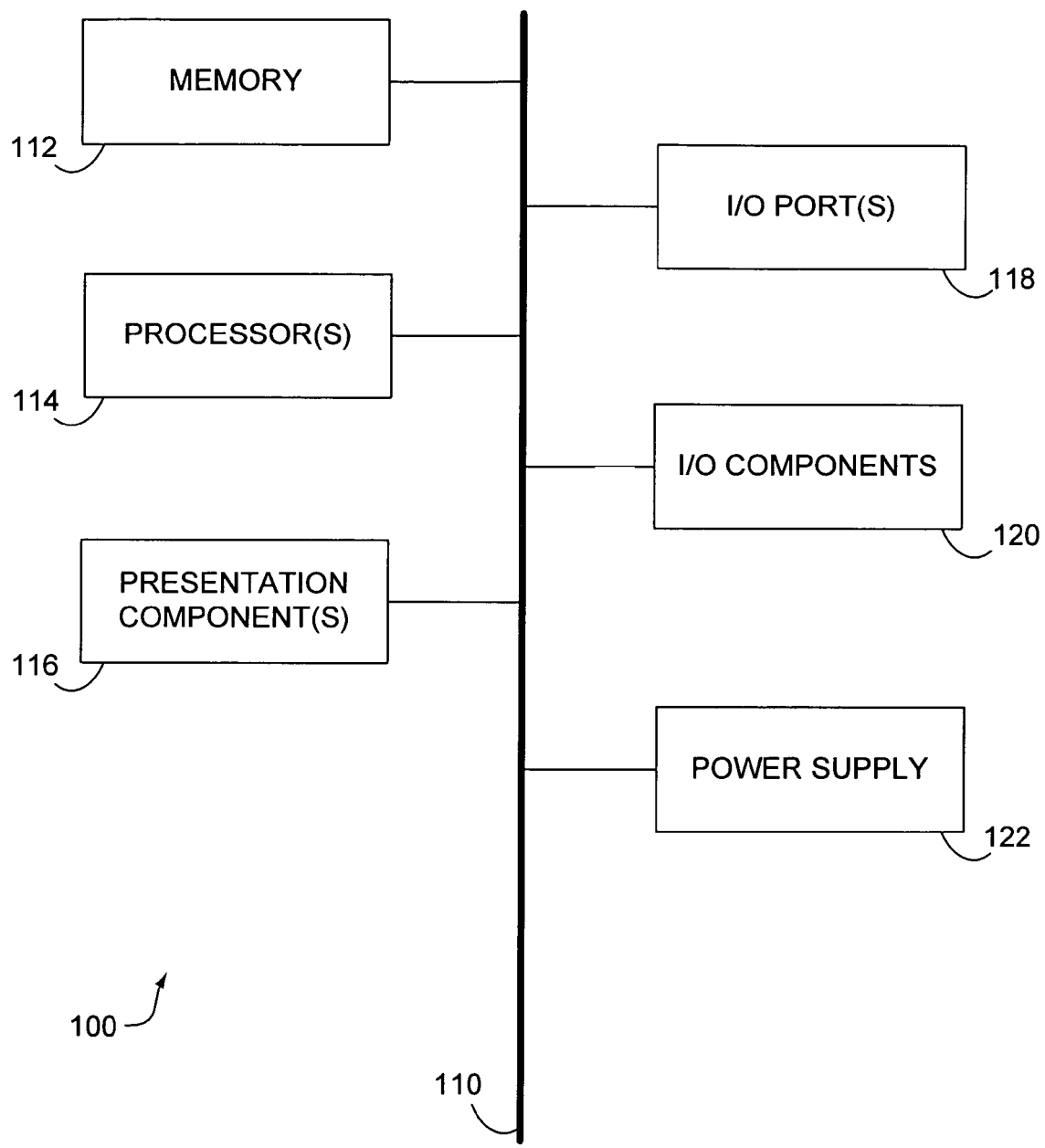
FIG. 1 is a block diagram of an exemplary operating environment.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following elements: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It should be noted that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As previously mentioned, embodiments of the present invention relate to methods for correcting undesired eye-coloring in a digital image. The digital image can be any electronic image format (e.g., .JPG, .GIF, .TIF, .BMP, .PDF, etc.) and is not limited to traditional computer image formats. The undesired eye-coloring can be any color. In some embodiments, for example, the eye color is red. The eye can be that of any subject. For example, the eye can be that of a human or an animal.

Figure 2:
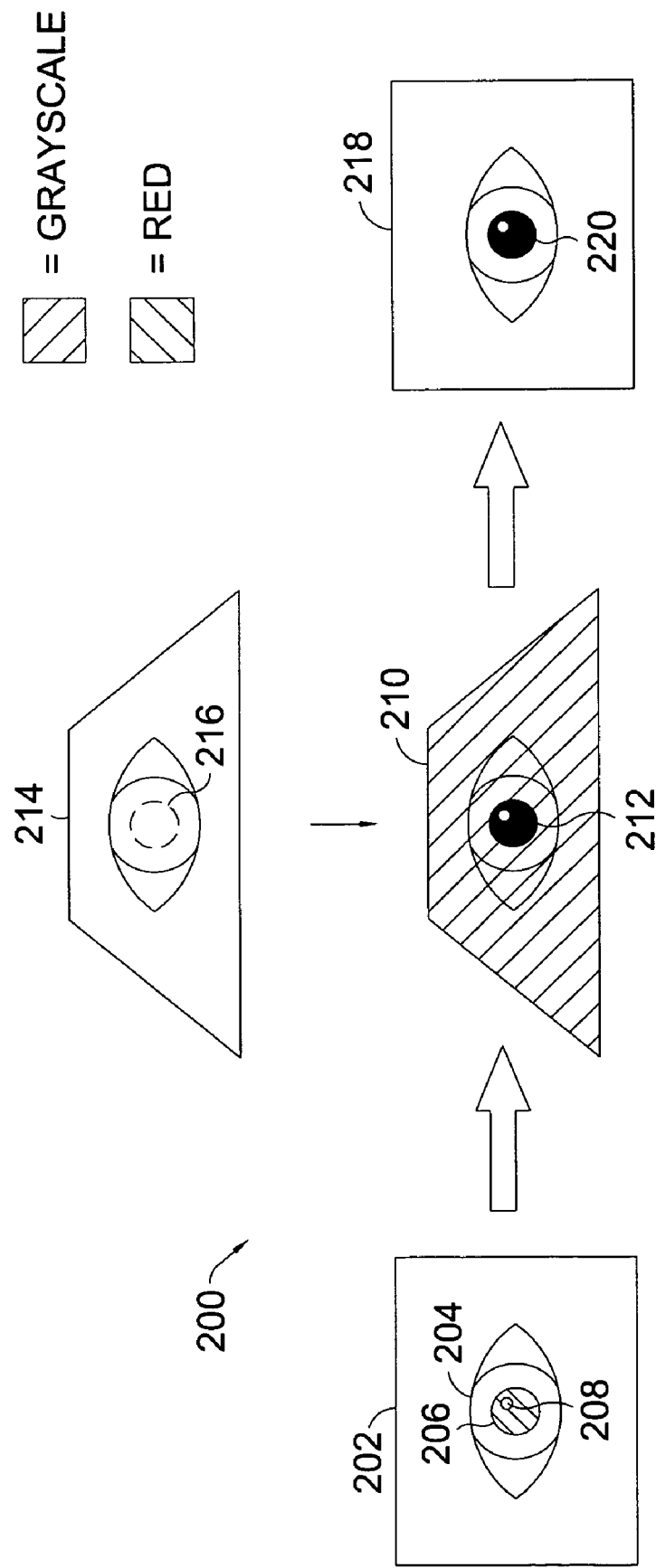
FIG. 2 is an exemplary visual representation of a red eye correction method, according to embodiments of the present invention.

FIG. 2 is an exemplary visual representation of a red eye correction method, according to embodiments of the present invention. Referring to FIG. 2, exemplary visual representation 200 includes original digital image 202. In an embodiment, original digital image 202 is any type of digital image in any image format in any operating environment, such as the exemplary environment discussed above. For example, in an embodiment, original digital image 202 is a color digital image in any digital color space. Original digital image 202 may comprise any subject matter, including at least one eye 204 to be corrected. In an embodiment, eye 204 is that of a human. However, embodiments are not limited to humans. For example, eye 204 may be the eye of an animal in an embodiment. Eye 204 comprises pupil 206 that is affected by the red-eye phenomenon that often occurs when using flash photography to capture digital image 202. The red-eye affected pupil 206 comprises a specular reflection 208 that is caused by the reflection of light off of the surface of the eye during capture of original digital image 202.

A grayscale format of channel mixed form 210 of digital image 202 is used to achieve blackened pupil 212, in an embodiment. Channel mixed form 210 of digital image 202 comprises only the information from a color channel that is orthogonal to an undesired eye color present in original digital image 202. In this particular example, channel mixed form 210 of digital image 202 comprises only the information from a color channel that is orthogonal to the undesired red eye color present in pupil 206, such as a green color channel, a blue color channel, or a combination of the green color channel and blue color channel. However, embodiments of the present invention are not limited to any particular orthogonal color. Channel mixed form 210 would appear grayscale if viewed as a discrete image; however, channel mixed form 210 is selectively blended with original form 214 of the digital image in this example.

Original form 214 is in the same original color as digital image 202 and comprises masked region 216 generated by using a masking effect. A variety of masking effects and image masks are known in the art. In various embodiments, masked region 216 is defined by user input or is defined by received parameters, such as parameters generated by a detection algorithm. Any well known detection algorithm may be used to generate the parameters. In an embodiment, the parameters are location, size, shape, radius, masking intensity, feathering amount, etc. However, embodiments of the present invention are not limited to any particular parameters or any combination or number of parameters. Blackened pupil 212 portion of channel mixed form 210 corresponding to masked region 216 is selectively applied to original form 214 of digital image 202 to generate corrected digital image 218. Corrected digital image 218 is in color and contains a corrected blackened pupil while still preserving specular reflection 208. However, embodiments of the present invention are not limited to pure black pupils. For example, a subject may have different colored pupils caused by an eye condition, such as a cataract.

In embodiments, masking intensity parameters are used to define the amount of information from channel mixed form 210 that is selectively blended with original form 214 in masked region 216. This facilitates a feathering effect to create a more natural looking pupil. A feathering effect applies channel mixed form 210 in a gradient-like fashion allowing less of channel mixed form 210 to appear through masked region 216 near the perimeter of masked region 216. Also, the feathering effect allows more of channel mixed form 210 to appear through masked region 216 near the center of masked region 216. The feathering effect is facilitated by using masking intensity, feathering amount, and other related parameters based on user input or on information received from a detection algorithm.

Figure 3:
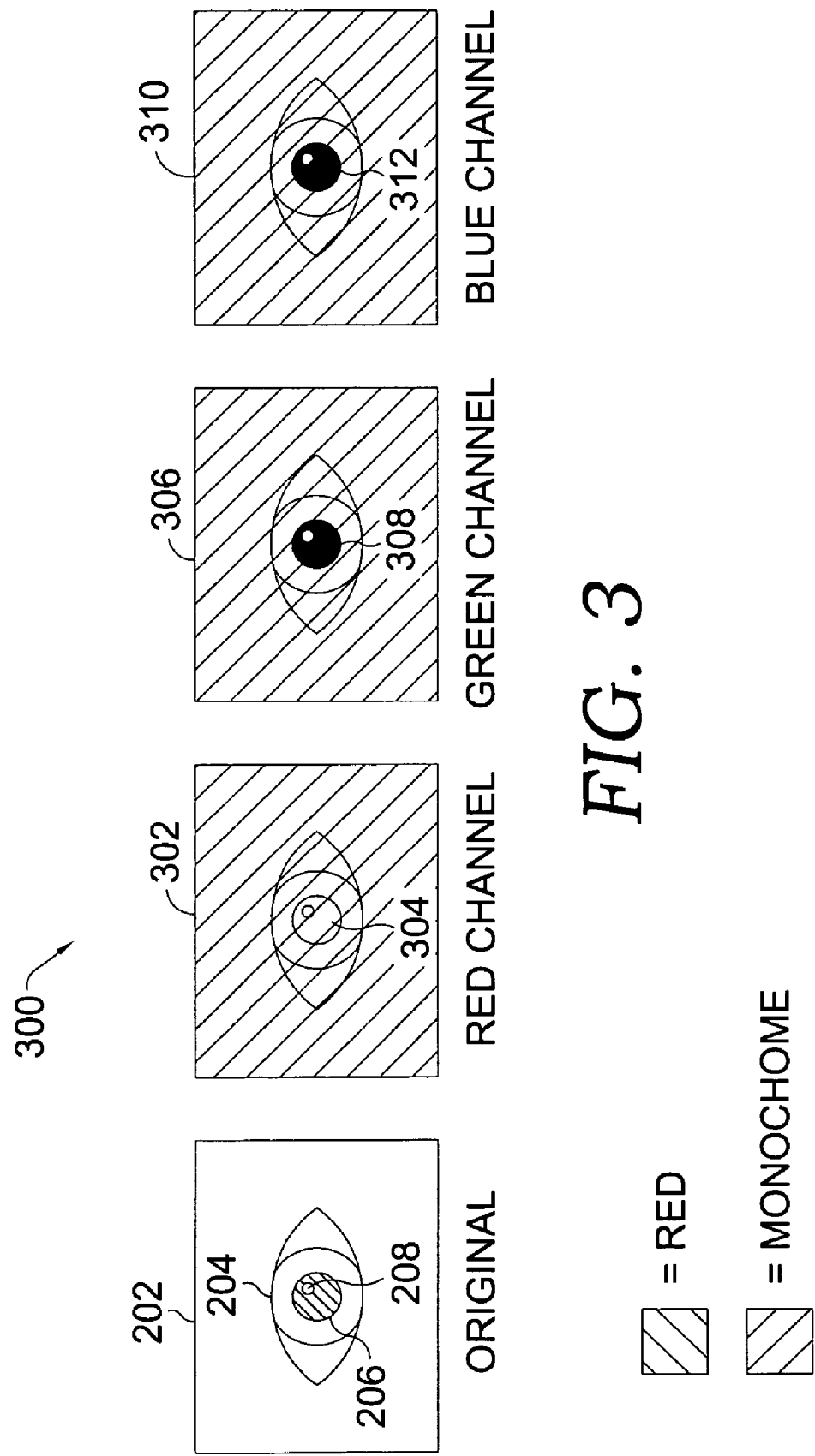
FIG. 3 is a diagram illustrating how different color channels are used, according to embodiments of the present invention.

In an embodiment, channel mixed form 210 is generated by using a channel mixing process that uses information from an orthogonal color channel. FIG. 3 is a diagram illustrating how different color channels are used, according to embodiments of the present invention. As shown in FIG. 3, digital image 202 comprises information from a series of color channels. In an RGB color space, red channel 302, green channel 306, and blue channel 310 comprise color information that is combined to create digital image 202. When viewed individually, the channels appear monochromatic with darkness and brightness (i.e. white, black, and varying amounts of each) based on luminance data corresponding to the intensity of that color channel at each point within digital image 202. The color channel of digital image 202 will appear very bright (i.e. white) where the color is to be displayed intensely and will appear very dark (i.e. black) where the color is to be displayed dimly or not at all.

In an embodiment, original digital image 202 comprising eye 204 of a subject may be depicted as having three color channels in an RGB color space scheme 300. For example, as illustrated in FIG. 3, in original digital image 202, which is in color, pupil 206 is red from the flash of a camera and pupil 206 contains specular reflection 208. In red color channel 302, the luminance data corresponding to red emits a very bright, white pupil region 304. That is, the luminance data instructs the operating environment to display a large amount of red information in pupil region 304. When red channel 302 is viewed alone, pupil region 304 appears white. This is because pupils affected with red-eye contain information that almost entirely exists in red channel 302.

In an embodiment, green channel 306 and blue channel 310 are orthogonal to red channel 302. As a result, green channel 306 and blue channel 310 both have luminance data instructing the operating environment to emit little or no green and blue in their respective pupil regions 308 and 312. That is, when green channel 306 is viewed by itself, it will appear monochromatic with black pupil region 308 where the color information is primarily red in original image 202. Little or no green coloring is emitted for the pupil region, because pupil 206 is red in digital image 202. And, when blue channel 310 is viewed by itself, it appears monochromatic with a dark or black pupil region 312 where the color information is primarily red. Little or no blue coloring is to be emitted for the pupil region, because pupil 206 is red in digital image 202. As a pupil affected with red eye contains information from red channel 302 almost entirely, both green channel 306 and blue channel 310 contain almost no luminance for the pupil. Thus, the pupil appears black when viewed monochromatically in just green channel 306 or just blue channel 310. These color channel characteristics described above can be used for red-eye correction. Embodiments of the present invention are not limited to only red-eye correction, as any undesired eye coloring (e.g., pet-eye) may be corrected using embodiments of the present invention.

Figure 4:
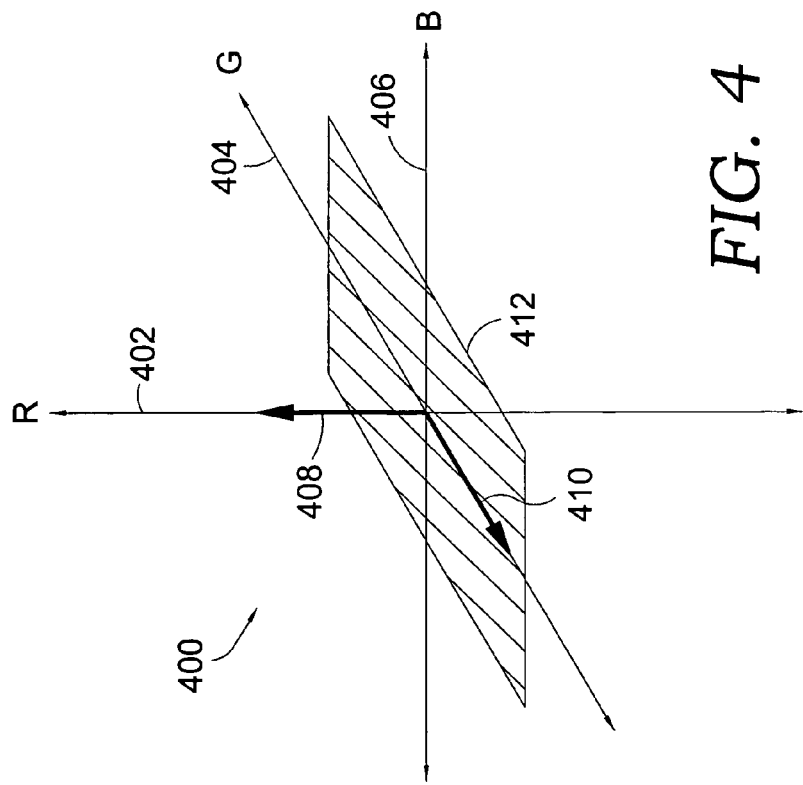
FIG. 4 is a diagram illustrating color vectors in an RGB color space.

FIG. 4 is a diagram illustrating color vectors in an RGB color space. As illustrated in FIG. 4, digital graphics can be represented in 3-dimensional space 400. For example, in an RGB color space, red axis 402 corresponds to red information, green axis 404 corresponds to green information, and blue axis 406 corresponds to blue information. The three axes are orthogonal, or perpendicular, to each other. A color in a digital image can be represented as a vector in 3-dimensional space 400. The color vector can have components along each of the three axes. The components correspond to the amount of color information for each particular color channel. Orthogonal colors are those whose color vectors are orthogonal to each other. For example, pure red color vector 408 is orthogonal to pure green color vector 410. And, green-blue plane 412, which contains color vectors corresponding to pure green, pure blue, and combinations of green and blue, is orthogonal to pure red color vector 408. Thus, pure green, pure blue, and any combination of only green and blue are orthogonal to pure red in 3-dimensional color space.

Figure 5:
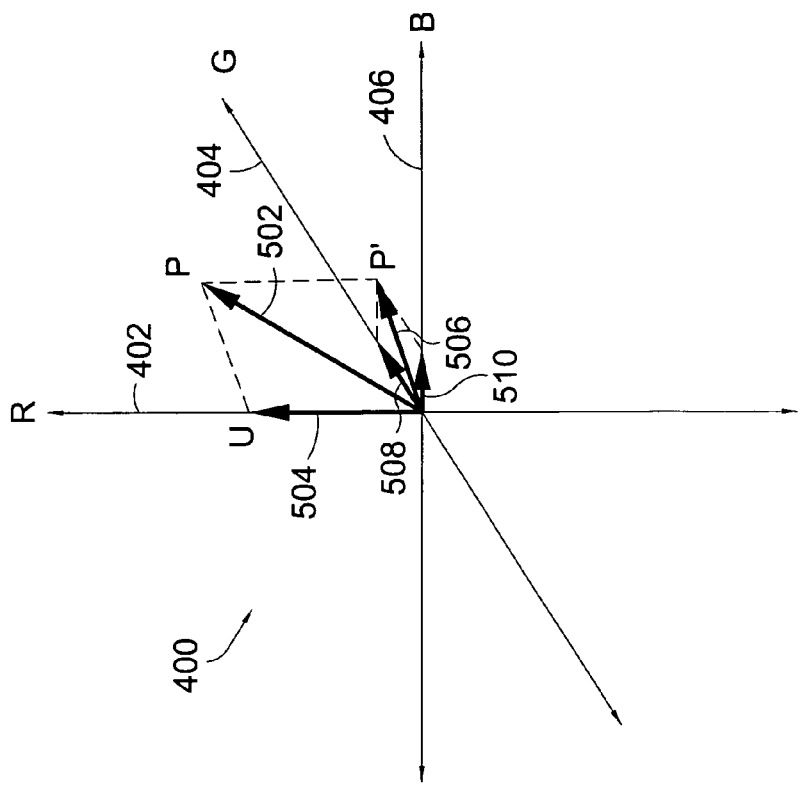
FIG. 5 is a diagram illustrating a color vector containing an undesired color component and a corrected color vector in an RGB color space, according to embodiments of the present invention.

FIG. 5 is a diagram illustrating a color vector containing an undesired color component and a corrected color vector in an RGB color space, according to embodiments of the present invention. In FIG. 5, a way of removing an undesired color component from a color vector to yield a corrected vector in a 3-dimensional color space is shown. In this example, target color vector 502 comprises undesired red color component 504, which lies along red axis 402 in 3-dimensional space 400. By using a channel mixing process, red color component 504 is removed from target color vector 502 to generate corrected color vector 506. Green information, corresponding to green component vector 508 and blue information corresponding to blue component vector 510 may be used, because they are orthogonal to red. That is, green component vector 508 and blue component vector 510 are orthogonal to red component vector 504. In an embodiment, a corrected color vector 506 is generated using any channel mixing process that removes an undesired color using information from an orthogonal color.

In an embodiment, an example of a channel mixing process that removes an undesired color is one that uses a channel mixer matrix. For example, by multiplying a target color vector P by a channel mixer matrix, an undesired color component U can be removed to yield a corrected color vector P'. This is only one example of a channel mixer matrix. This example is depicted visually in FIG. 5, which is discussed above.

$$\vec{P} = (r, g, b)$$
$$\vec{U} = (R, G, B)$$
$$\vec{P}' = (r', g', b')$$
$$\vec{P} = (\vec{P} \cdot \vec{U})\vec{U} + \vec{P}'$$
$$\vec{P}' = \vec{P} - (\vec{P} \cdot \vec{U})\vec{U}$$
$$r' = r - (rR + gG + bB)R$$
$$g' = g - (rR + gG + bB)G$$
$$b' = b - (rR + gG + bB)B$$
$$\begin{pmatrix} r' \\ g' \\ b' \end{pmatrix} = \begin{pmatrix} 1-R^2 & -RG & -RB \\ -RG & 1-G^2 & -GB \\ -RB & -GB & 1-B^2 \end{pmatrix} \begin{pmatrix} r \\ g \\ b \end{pmatrix}$$

Another possible way to remove an undesired color component U from a given target color vector P is to determine the largest scalar value k that can be multiplied by U and subtracted from P that does not yield negative color values in any of the coordinates of P'.

$$P' = P - kU$$

Other ways known in the art can also be used to remove an undesired color component from a given color vector. These methods depend on the particular color space used. In embodiments of the present invention, an RGB color space is used primarily for performance purposes, but other color spaces (e.g., Lab, LUV, etc.) can be used.

Once a corrected color vector P' is obtained, its luminance information can be used to yield black or dark in locations where the undesired color vector U is of greatest intensity. This is because the corrected color vector P' is orthogonal to the undesired color.

FIG. 6 is a diagram illustrating a red-eye correction method, according to embodiments of the present invention. As discussed above with reference to FIG. 2, one embodiment achieves blackened pupil 220 using masked region 216 in the original form of digital image 214. Another embodiment is depicted in pictorial representation 600, as shown in FIG. 6. A blackened pupil can be achieved by using a masking effect to only apply blackened pupil 606 from grayscale luminosity data of channel mixed form 602 of the image to original form 608 of the color image comprising eye 610 affected by reddened pupil 612. In an embodiment, the rest of channel mixed form 602, including the rest of eye 604, appears in grayscale and is not the desired appearance for the corrected image, which is to be in color, so these areas are blocked by the masking effect. In essence, blackened pupil 606 is placed "on top" of reddened pupil 612. The perimeter of blackened pupil 606 can be feathered as discussed above. Embodiments of the present invention are not limited to only red-eye correction, as any undesired eye coloring (e.g., pet-eye) may be corrected using embodiments of the present invention.

Figure 7:
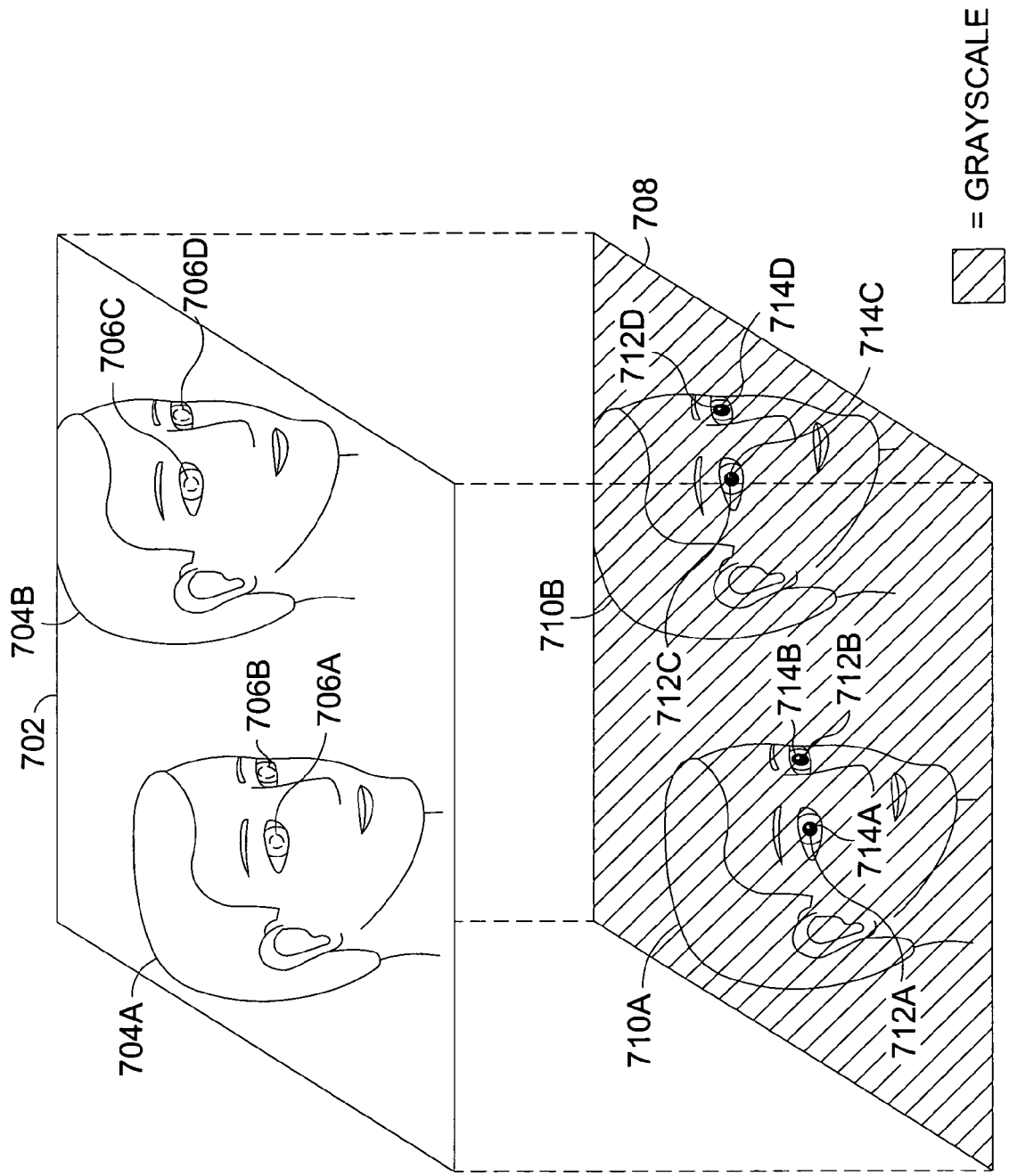
FIG. 7 is a diagram illustrating an eye color correction method for a digital image containing multiple regions to be corrected, according to embodiments of the present invention.

FIG. 7 is a diagram illustrating an eye color correction method for a digital image comprising multiple regions to be corrected, according to embodiments of the present invention. With reference to FIG. 7, pictorial representation 700 of a red eye correction method for multiple eyes of multiple subjects in a digital image in accordance with embodiments of the present invention is shown. In this example, digital image 702 comprises two human subjects 704A and 704B with pupil-shaped target regions 706A-D. In an embodiment, user input or a detection algorithm defines the target regions 706A-D with region parameters. For example, in an embodiment, the region parameters may include location parameters and size parameters. Luminosity layer 708 generated from a channel-mixed layer of the digital image using an orthogonal color channel has two subjects 710A and 710B that appear in grayscale. The green channel is orthogonal to red, so it may be used as the orthogonal color channel. However, embodiments are not limited thereto. Luminosity layer 708 contains the grayscale luminance information from the orthogonal color channel. Luminosity layer 708 has blackened pupils 712A-D and preserved specular reflections 714A-D. By using a masking effect, blackened pupils 712A-D of luminosity layer 708 may be selectively applied to the digital image 202 at target regions 706A-D. In this manner, multiple eyes of multiple subjects in a digital image can be corrected.

FIG. 8 is a flow chart depicting an eye color correction method using a channel mixing process, according to embodiments of the present invention. With reference to FIG. 8, exemplary method 800 for performing embodiments of the present invention is described. Initially, an original digital image is accessed (802). The digital image may be in any digital image format and may be stored in any manner. The digital image may originate from any digital image source. By way of example and not limitation, the digital image may originate from a digital camera, a web-based camera, an electronic communications device camera (cell phone, blackberry, PDA, etc.), a scanned-in image, or any other image stored on a computer-readable medium. The digital image may also be captured from a video source. The digital image contains color data that is accessed. An undesired eye color is received from the digital image (804). The undesired color is any eye color to be removed, corrected, substituted, or replaced from the digital image. For example, for red-eye correction, the color red is the undesired color. For pet-eye correction, the color green is often the undesired color. The undesired color can be received from user input or from a detection algorithm and may be any color. For example, a user may indicate a desire to correct red-eye in a digital image.

For the particular undesired eye color, an orthogonal color is identified (806). The orthogonal color may be identified using any method for identifying an orthogonal color from an undesired color. For example, pure green is an orthogonal color from pure red. In an embodiment, green is identified as the orthogonal color from red. Embodiments of the present invention are not limited to any particular colors.

A channel mixing process is performed on an original form of the digital image to generate a channel-mixed form of the image (808). In an embodiment, the original form is simply the original digital image. By way of example, and not limitation, a channel mixer matrix can be used to perform the channel mixing process. The channel mixing process removes the undesired color by using information from the orthogonal color. For example, red may be removed by using information from the green channel, the blue channel, or from a combination of the green channel and the blue channel.

Finally, the channel-mixed form of the image is selectively blended with the original form of the image to generate a corrected digital image that does not include the undesired eye color (810). In an embodiment, this may be done by using a mask to selectively blend regions of the channel-mixed form with corresponding regions of the original form of the image. The regions identify the portions of the original digital image that contain the undesired eye color to be removed. A mask operates to apply a particular effect from one form of an image to another form of an image. In this case, in an embodiment, a mask can be used to make target regions of the original form of the image transparent to corresponding regions of the channel-mixed form of the image. Additionally, in an embodiment, the mask can be applied with a feathering effect that applies the effect with varying masking intensities. This feathering effect softens the edges of the correction to yield a more natural-looking eye.

FIG. 9 is a flow chart depicting an eye color correction method using layers, according to embodiments of the present invention. With reference to FIG. 9, exemplary method 900 for performing embodiments of the present invention is described. Initially, an original digital image is accessed (902). Correction region parameters for the digital image are then received (904). In an embodiment, the region parameters may be received from user input or may be received from a detection algorithm. Any detection algorithm may be used. Detection algorithms operate to identify portions of a digital image affected by an eye coloration problem. These algorithms output parameters identifying regions where a correction method is to be applied. The region parameters can be any parameters relating to the size, shape, location, or other defining characteristics needed to define the regions of a digital image affected by red-eye or other eye discoloration. Embodiments of the present invention are not limited to any specific parameters or set of parameters. User input of region parameters can be any user input defining regions of the digital image to which the method 900 is to be applied. For example, the user input can be a targeted click or a marquee selection.

During performance of method 900, a channel mixed layer of the digital image is generated using an orthogonal color channel (906). The orthogonal color channel is a channel corresponding to a color that is orthogonal to the undesired eye color. In embodiments, the undesired eye color is red. However, embodiments are not limited to any particular undesired color. An example of an orthogonal color channel that is orthogonal to red is the green channel in an RGB color space. The blue channel in an RGB color space is also an example of an orthogonal color channel that is orthogonal to red. And, any color channel comprising a combination of blue and green is also an example of an orthogonal color channel that is orthogonal to red. A layer is a separate portion of a digital image file that is stored separately from the digital image itself. A digital image, for example, may be stored in a format that separates the image into different image layers that are combined to produce the digital image. In one embodiment of the present invention, the digital image is stored in a layered environment. In another embodiment of the present invention, the digital image is flat, or rasterized.

The channel mixed layer of the digital image generated from the orthogonal color channel is then converted to a corresponding luminosity layer (908). In an embodiment, this conversion can be a grayscale conversion, a desaturation process, or any conversion that extracts the luminosity information from the orthogonal color channel. The luminosity layer is monochromatic with bright areas corresponding to areas containing large amounts of the orthogonal color and dark areas containing little or no amounts of the orthogonal color. For example, in pupil-shaped regions affected by red-eye, a luminosity layer generated from a green color channel has corresponding blackened pupil-shaped regions.

Next, the luminosity layer is selectively applied to the digital image to generate a corrected digital image with blackened pupils and preserved specular reflections (910). In an embodiment, the luminosity layer is selectively applied using a masking effect to apply the luminosity layer to at least one target region of the digital image defined by the received region parameters. The masking effect allows the target regions of the digital image to be transparent to the underlying luminosity layer. In essence, the masking effect "pokes holes" through the digital image in the regions affected by eye discoloration to allow the black regions of the luminosity layer to appear. In an embodiment, the luminosity layer is monochrome, so the remainder of the luminosity layer must be "covered" by the unmasked portions of the original digital image layer.

In an embodiment, the masking effect is feathered so as to apply the luminosity layer in a gradient-like fashion to soften the edges of the pupils and generate a natural-looking pupil that does not obviously appear to have been altered. The characteristics of the feathering can be defined by received parameters that have been generated by a detection algorithm or that have been received from user input. The corrected digital image may then be rasterized and stored separately from the image layers or stored as a project file with a series of separate layers preserved.

Figure 10:
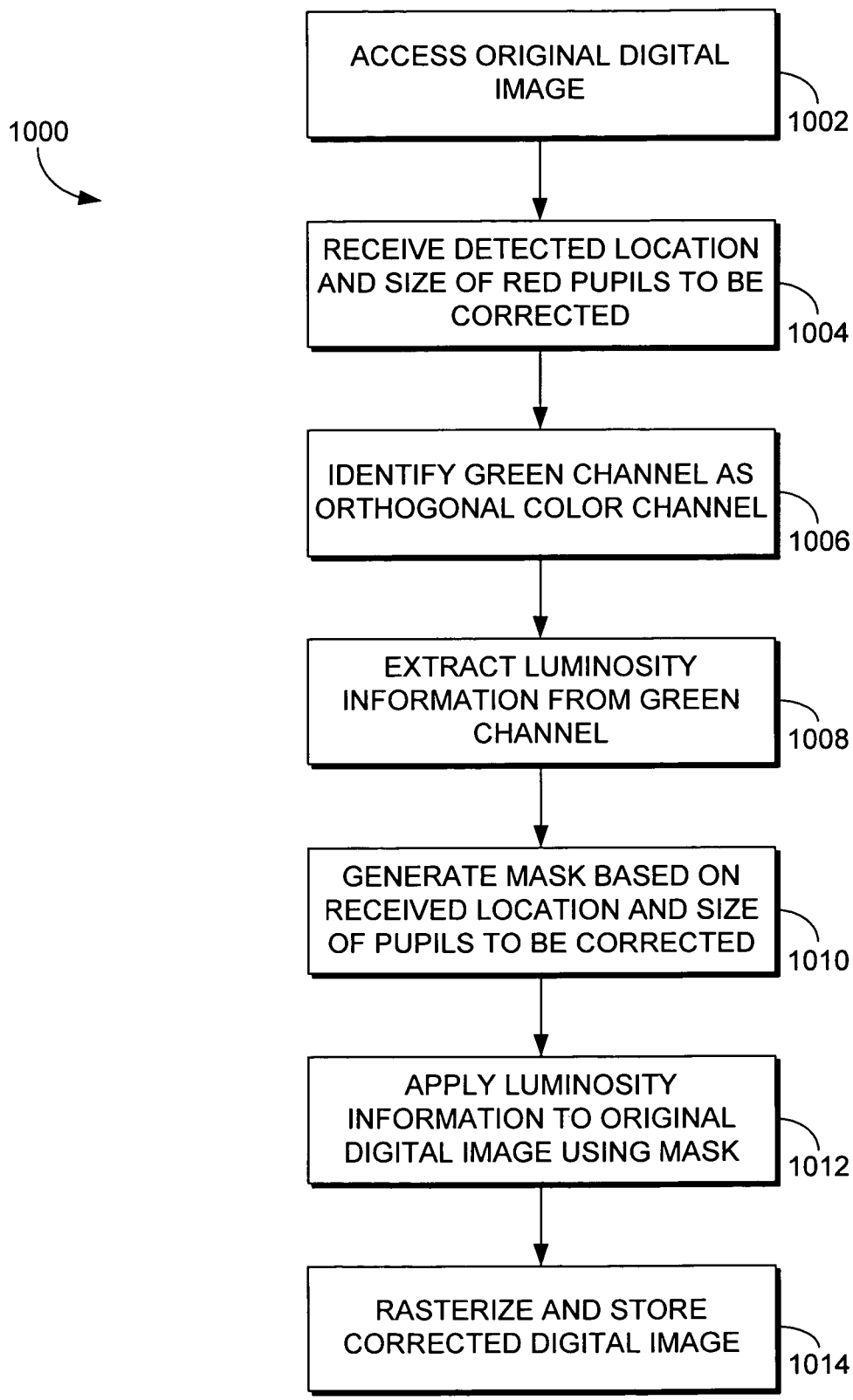
FIG. 10 is a flow chart depicting a red eye correction method using a green color channel, according to embodiments of the present invention.

FIG. 10 is a flow chart depicting a red-eye correction method using a green color channel according to embodiments of the present invention. With reference to FIG. 10, exemplary method 1000 for replacing pupils affected by red-eye in a digital image with black pupils is described. An original digital image containing red-eye affected pupils is accessed (1002). Next, location and size parameters defining the red pupils to be corrected are received from a detection process (1004). In an embodiment, the detection process may be any detection algorithm known in the art. The green color channel is then identified as the orthogonal color channel to be used to correct the red pupils (1006). The luminosity data output by the green color channel is then extracted (1008). Next, a feathered mask is defined based on the received location and size parameters to designate regions of the digital image to which the luminosity data is to be applied (1010). Then, the mask is used to apply the luminosity data in a gradient-like fashion to the pupil regions to generate a corrected digital image containing natural-looking black pupils in place of the red pupils (1012). Additionally, the specular reflections present in the pupils are preserved. Finally, the image is rasterized and stored as a corrected digital image (1014). This exemplary method 1000 provides a simple, efficient, reliable way to replace red-eye affected pupils in a digital image with natural-looking black pupils. While only red and green are discussed with regard to FIG. 10, other colors may be used when implementing the method described in FIG. 10. Exemplary method 1000 can be performed in any suitable environment, such as that described above with reference to FIG. 1, including, by way of example and not limitation, an operating system environment.

Although the subject matter has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense. And, although the subject matter has been described in language specific to methodological acts, the subject matter defined in the appended claims is not necessarily limited to the specific acts described above. Rather, the specific acts described above are disclosed as example forms of implementing the claims.

The invention claimed is:

1. Computer-readable media having computer-executable instructions embodied thereon that, when executed, perform a method for removing undesired eye color from a digital image, the method comprising:
   identifying a measure of one or more orthogonal color vectors based on one or more undesired eye colors present in the digital image;
   performing a channel mixing process on the one or more undesired eye colors of an original form of the digital image using information from the measure of the one or more orthogonal color vectors to generate a channel mixed form of the digital image, wherein the channel mixed form only includes information from one or more color channels that are orthogonal to the one or more undesired eye colors;
   extracting luminance data from only the one or more color channels orthogonal to the one or more undesired eye colors present in the digital image;
   converting a channel mixed layer to a corresponding luminosity layer using the luminance data;
   selectively blending the channel mixed form with the original form of the digital image to generate a corrected digital image that does not include the one or more undesired eye colors; and
   selectively applying the luminosity layer to the corrected digital image to form a specular reflection.

2. The computer-readable media of claim 1, further comprising:
   generating a channel mixer matrix using information from the undesired color, wherein the channel mixing process uses the channel mixer matrix to remove the undesired color information from the original form of the digital image.

3. The computer-readable media of claim 1, wherein the channel mixed form is converted to grayscale before the channel mixed form is selectively blended with the original form of the digital image.

4. The computer-readable media of claim 1, wherein the channel mixed form is selectively blended with the original form of the digital image at at least one location within the digital image, wherein the digital image is defined by received parameters.

5. Computer-readable media having computer-executable instructions embodied thereon that, when executed, perform a method for correcting eye pupil color in a digital image, the method comprising:
   receiving identification of an undesired eye pupil color present in the digital image;
   determining an orthogonal color channel based on the undesired eye pupil color;
   extracting luminance data from the orthogonal color channel of the undesired eye pupil color;
   converting a channel mixed layer to a corresponding luminosity layer using the luminance data wherein the channel mixed layer only includes information from the orthogonal color channels;
   applying the channel mixed layer to the digital image using a mask generated from received parameters to generate a corrected digital image that does not include the undesired eye pupil color; and
   applying the luminosity layer to the corrected digital image to form a specular reflection on the corrected digital image.

6. The computer-readable media of claim 5, wherein the undesired eye pupil color is red.

7. The computer-readable media of claim 5, wherein the orthogonal color channel is a green channel, a blue channel, or a color channel comprising a combination of the blue channel and the green channel.

8. The computer-readable media of claim 5, wherein the luminosity layer is applied using a feathered masking effect.

9. The computer-readable media of claim 5, wherein the mask comprises at least one pupil-shaped region designating a region of the digital image where the grayscale luminance information is applied.

10. The computer-readable media of claim 5, wherein the mask is applied using a feathering effect that applies varying amounts of the grayscale luminance information at different locations within at least one pupil-shaped region.

11. Computer-readable media having computer-executable instructions embodied thereon that, when executed, perform a method for replacing an undesired eye color with a desired eye color in a digital image, the method comprising:
   receiving region parameters for at least one target region within the digital image, wherein the at least one target region contains an undesired eye color;
   generating a channel mixed layer, wherein the channel mixed layer only includes information from a color channel that is orthogonal to the undesired eye color;
   converting the channel mixed layer to a corresponding luminosity layer; and
   selectively applying the luminosity layer to the digital image to generate a corrected digital image that does not include the undesired eye color.

12. The computer-readable media of claim 11, wherein the selective application of the luminosity layer comprises using a masking effect to apply the luminosity layer to the at least one target region of the digital image.

13. The computer-readable media of claim 11, wherein the at least one target region is defined according to the received region parameters and wherein the received region parameters are based on at least one of user input and information generated by a detection algorithm.

14. The computer-readable media of claim 11, wherein the at least one target region is pupil-shaped.

15. The computer-readable media of claim 11, wherein the received region parameters comprise a location parameter and a size parameter.

16. The computer-readable media of claim 11, wherein the undesired eye-coloring is red, the desired eye-coloring is black, and the orthogonal color channel is a green channel, a blue channel, or a channel comprising a combination of the green channel and the blue channel in an RGB color space.

17. The computer-readable media of claim 11, further comprising:
   storing the corrected digital image as a segmented image.

* * * * *